United States Patent [19]

Rädisch et al.

[11] Patent Number: 4,609,688

[45] Date of Patent: Sep. 2, 1986

[54] TRANSPARENT, ANTI-FOGGING COATING COMPRISED OF PLASTIC MATERIAL CONTAINING A SURFACE ACTIVE AGENT

[75] Inventors: Helmer Rädisch, Aachen; Werner Scholz, Pulheim, both of Fed. Rep. of Germany

[73] Assignee: Saint-Gobain Vitrage, Courbevoie, France

[21] Appl. No.: 725,679

[22] Filed: Apr. 22, 1985

Related U.S. Application Data

[62] Division of Ser. No. 632,465, Jul. 19, 1984, Pat. No. 4,551,484.

[30] Foreign Application Priority Data

Jul. 22, 1983 [FR] France ............... 83 12139

[51] Int. Cl.[4] ............................................. C08L 75/04
[52] U.S. Cl. .................................. 523/169; 427/389.7; 427/430.1; 427/443.2; 428/410; 428/425.6; 524/375; 524/376; 524/377; 528/49; 528/494

[58] Field of Search .............. 523/169; 524/375, 376, 524/377; 528/49, 494; 427/389.7, 430.1, 443.2; 428/410, 425.6

[56] References Cited

U.S. PATENT DOCUMENTS

| | | | |
|---|---|---|---|
| 3,933,407 | 1/1976 | Tu et al. ............................ | 428/447 |
| 4,307,004 | 12/1981 | Schuhmacher et al. ............ | 528/61 |
| 4,467,073 | 8/1984 | Creasy ............................... | 525/127 |

Primary Examiner—Maurice J. Welsh
Attorney, Agent, or Firm—Oblon, Fisher, Spivak, McClelland & Maier

[57] ABSTRACT

The invention relates to a transparent, antifogging coating or film comprised of a plastic material, which coating or film may be employed as an external layer in a laminated pane.

The invention transparent coating or film is a highly elastic, three-dimensionally crosslinked layer comprised of at least one surface active agent disposed within its crosslinked structure.

8 Claims, No Drawings

TRANSPARENT, ANTI-FOGGING COATING COMPRISED OF PLASTIC MATERIAL CONTAINING A SURFACE ACTIVE AGENT

This is a division, of application Ser. No. 632,465, filed July 19, 1984 and now U.S. Pat. No. 4,551,484.

BACKGROUND OF THE INVENTION

1. Field of the Invention

The invention relates to a transparent coating or film comprised of a plastic material, and to safety glass panes covered with such a coating or film and employed particularly on means of transport, and in particular the invention relates to improvement in the performance of such panes in the presence of hazards of condensation and fogging.

2. Description of the Prior Art

Certain safety glass panes are being increasingly used, in large sizes in vehicles, vessels and buildings, and in small sizes in smaller windows, masks, lenses, etc. These panes comprise a monolithic or laminated support comprised of glass or a plastic material and covered, by the intermediary of an adhesive layer, by a coating or film of a transparent, "anti-laceration" plastic material, i.e. a coating or film which, in the event of breakage of the glass pane, covers the sharp edges of the glass fragments and prevents possible injury to passengers due to these sharp edges. The said plastic coating or film covering is also self-healing, i.e. it is comprised of a plastic material wherein local impressions or scratches (abrasive impressions) on the surface disappear spontaneously in a short time. Such glass panes are described, e.g., in Fr. Pat. Nos. 2,187,719, 2,316,913, 2,320,563, and 2,398,606. Such panes may comprise, e.g., a laminated glass pane comprised of two glass sheets joined by an intercalated sheet of a plastic material such as polyvinyl butyral and covered by a coating or film of a transparent plastic material essentially comprised of a heat-setting polyurethane.

Automobile windshields in particular may be subjected to sudden changes of temperature and humidity. After the surface temperature of the windshield falls below the dewpoint of the ambient air, water condensation occurs, which can impede the driver.

The effects of the fogging phenomenon vary appreciably depending on the type of transparent surface. On bare glass, the droplets of water spread out much more readily than on an organic film. By simple wiping of the bare glass, a water film is formed which is relatively regular and transparent from the optical standpoint, and the presence of this water film itself substantially attenuates the adverse optical effects of the condensation. In general, where the surface comprises a film of a plastic material, the droplets of condensed water may be much more prominent and dense; this phenomenon varies over a wide range depending on the nature of the film. In this case, simple wiping action will remove the droplets but cannot form a water film, and the fogging may recur even more quickly than it developed originally.

Various solutions have been proposed in the past to ameliorate the fogging behavior of transparent surfaces of glass or plastic material.

The general technique is known of applying hydrophilic agents to the transparent surface, which agents can mix with the water when there is a fogging hazard, to form a homogeneous thin film. For example, one may appreciably improve the antifogging properties of a surface by applying a film of compounds of (ethylene) glycol or compounds of glycerin. However, these water-soluble compounds are removed as soon as wiping occurs, and thus need to be resupplied perpetually, which is inconvenient and costly.

German Pat. No. 1,928,409, for example, discloses other antifogging treatment methods for transparent surfaces, said methods comprising the application of films of polyacrylate and/or polymethacrylate compounds with free hydroxyl groups. These very hydrophilic films absorb water without being dissolved themselves. As a result of the absorption of water these films swell more or less substantially; further, they soften and become more sensitive to abrasion which eventually has an adverse effect on the transparence of the surface treated.

Thus, when one employs antifogging treatments comprising the application of antifogging surface films, one inevitably faces the dilemma of conflicting requirements: Improved antifogging action reduces abrasion resistance, while improved abrasion resistance corresponds to lessened antifogging action. One seeks means of improving the abrasion resistance of the films by introducing a hardening agent into their composition. However, in general such hardening agents achieve their effect by polycondensation with the polymers which comprise the film. In so doing they render unavailable the hydroxyl-type groups which confer on the film the hydrophilic properties which promote antifogging action.

In the case of glass pane covered with a coating or film of palstic material which has antilaceration and self-healing properties, e.g. a pane such as described in one or more of French Pat. Nos. 2,187,719, 2,316,913, 2,320,563, and 2,398,606, the fogging problem, while diminished in comparison to that with a classical monolithic or laminated glass pane, is nonetheless present, and is posed in terms which may be more complex: A treatment may not under any conditions diminish the excellent antilaceration and self-healing properties which are conferred by the said coating or film of transparent plastic material; the treatment must be effective over a long period of time; and the treatment may not modify the nature of the coating or film or plastic material in such a way as to carry the risk of detriment to other properties which said coating or film confers on the said glass pane.

SUMMARY OF THE INVENTION

It is thus an object of the present invention to devise a transparent coating or film of a plastic material which has antilaceration and self-healing properties, which coating or film resists fogging and is usable in particular in the types of laminated glass panes described above;

and the invention includes a method of manufacturing the inventive coating or film.

This and other objects of the invention have been attained by a coating or film, which will be referred to as the "antifogging film", comprised of a highly elastic, transparent, three-dimensionally crosslinked plastic material containing at least one surface active agent in its crosslinked structure. By "a three-dimensional crosslinked structure" is meant a structure comprising a certain number of crosslinking bonds between linear or branched chains. It appears that due to the existence of a three-dimensional system of crosslinkage the surface active agents become located at anchorage points in the crosslinked structure, where they remain durably fixed.

DESCRIPTION OF THE PREFERRED EMBODIMENTS

The coating or film may thus be advantageously employed as an external antilaceration and/or self-healing layer on a laminated pane comprised of a monolithic or laminated support of a silicate glass or plastic material.

Such a structure is particularly advantageous with respect to resistance to fogging. In novel fashion, the surface active agent is distributed within the film while retaining its said agent's known hydrophilic properties. Due to the supply of hydrophilic sites thus made available, the antifogging effect persists over a long period of time. Further, surprisingly, one finds improvement in certain surface properties of the inventive film in comparison to the properties of an antilaceration, self-healing film with a crosslinking structure which does not incorporate a surface active agent in said structure. In particular, the abrasion resistance is improved, as demonstrated hereinafter.

The invention has particular importance in applications respective automotive windshields due to the importance of this area of application, but it is not limited to said area.

The invention is a general means of improving the antifogging properties of various types of transparent surfaces covered with a coating or film of transparent, highly elastic, three-dimensionally crosslinked plastic material, e.g. eyeshields of helmets, security windows, and driver's masks, which surfaces also may be subjected to large variations (differences) in temperature and humidity under various circumstances.

The invention is applied in particular to films of heat-setting polyurethane. It may also be applied to coatings or films of polyurethane produced by reactive molding at elevated temperature (on the order of 80° to 140° C.) from essentially bifunctional components, which production method involves branching reactions and thus crosslinking reactions. By "reactive molding" is meant flow-molding in the form of a coating or film comprised of a liquid mixture of components in the monomeric or prepolymeric state, followed by polymerization of the mixture by application of heat.

The invention is preferably applied to a layer of transparent plastic material comprised essentially of a heat-setting polyurethane material obtained from two groups of reactants: one or more bifunctional aliphatic isocyanates (e.g., 1,6-hexanediisocyanate, 2,4,4-trimethyl-1,6-hexanediisocyanate, 2,2,4-trimethyl-1,6-hexanediisocyanate, 1,3-bis(isocyanatomethyl)benzene, methylenebis(4-cyclohexaneisocyanate), methylenebis(3-methyl-4-cyclohexaneisocyanate), 2,2-bis(3'-isocyanatocyclohexyl)propane, and 3-isocyanatomethyl-3,5,5-trimethylcyclohexylisocyanate), or biurets, isocyanurates, and prepolymers prepared from two of the preceding compounds and having a functionality of 3 or more; and as the second group of reactants, polyfunctional polyols, e.g. branched polyols such as polyester polyols and polyether polyols obtained by reaction of polyfunctional alcohols (e.g., glycerin, 2,2-bis(hydroxymethyl)-1-propanol, 2,2-bis(hydroxymethyl)-1-butanol, 1,2,4-butanetriol, 1,2,6-hexanetriol, 2,2-bis(hydroxymethyl)-1,3,-propanediol ("pentaerythritol"), and 1,2,3,4,5,6-hexanehexol ("sorbitol")) with one or more aliphatic diacids (e.g., malonic acid, succinic acid, glutaric acid, adipic acid, suberic acid, and sebacic acid), or with one or more cyclic ethers (e.g., epoxyethane, 1,2-epoxypropane, and tetrahydrofuran), wherewith the molecular weights of the branched polyols are generally in the range of about 250 to 4000, preferably about 450 to 2000. Mixtures of different polyisocyanates and polyols may be employed.

The surface active agents entering into the composition of the antifogging film may comprise such agents of the nonionic, anionic, or cationic type. Preferably they are chosen from among the nonionic surface active agents, particularly ethoxylated fatty alcohols more preferably $C_8$–$C_{16}$ linear ethoxylated fatty alcohols such as, for example, ethoxylated lauryl alcohol.

The invention also relates to a method of forming antifogging coatings or films. According to the inventive method, the film is placed in contact with a formulation comprised of at least one surface active agent, under conditions and for a duration sufficient to permit diffusion of molecules of the surface active agent(s) into at least part of the interior of the film in the thickness dimension.

The formulation employed is preferably in liquid form. For example, the surface active agents may be placed in solution or they may themselves be in the liquid state at the temperatures at which the method is carried out.

According to a preferred feature of the invention, the film may be treated by steeping it in a liquid formulation. Further, since the diffusion of the molecules of the surface active agent(s) is accelerated by an increase in temperature, a temperature between 20° and 120° C. is used, preferably between 80° and 100° C. Increasing the temperature concomitantly reduces the duration of the treatment, which may be between one-half and two hours.

According to another feature of the invention, the treatment is carried out under elevated pressure, e.g. on the order of 5 to 15 bar, and preferably 10 to 15 bar.

The composition of the bath of surface active agent(s) in which the film is steeped may be varied substantially, with respect to the type(s) of surface active agent(s) and also the type of solvent or diluent which may also be optionally used. The surface active agents may be liquids or solids which are soluble in a suitable solvent.

One preferred such solvent is water. One might mention nonionic surface active agents, particularly ethoxylated fatty alcohols such as ethoxylated $C_8$–$C_{16}$ linear alcohols; water soluble solid surface active agents of the anionic or cationic type, or water soluble solid surface active agents of the nonionic type in diluted form.

Preferably a surface active agent of the nonionic type is employed which is a liquid at the temperature of the treatment.

Where the invention film is to be employed as a constituent part of a safety glass pane, particularly in a case where it is to be employed as external layer of such a glass pane, it is advantageous, according to one of the features of the invention, to incorporate the treatment within the manufacturing process for the glass pane.

For example, the film may be treated, e.g. by steeping it in the bath of surface active agent(s), at a time when said film is in the form of a flexible film prior to being combined with the support (which may be monolithic or laminated, and of a silicate glass or plastic material) to form the laminated pane. In this case the steeping process is carried out at atmospheric pressure.

According to a preferred feature of the invention, the film may be treated, e.g. by steeping it in the bath of surface active agent(s), in a condition of preliminary combination with the support to preliminarily form the laminated pane. This embodiment of the method according to the invention is particularly advantageous because it permits permanent adhesion of all the layers of the laminated pane (particularly the adhesion of the sheet or film to the support) to be established in a single operation, simultaneously with the antifogging treatment. In this case the treatment is carried out in an autoclave, under the conditions of temperature and pressure corresponding to those usually prevailing in the manufacture of the glass pane, particularly when said pane is an automobile windshield.

This phase of the fabrication may be carried out in an autoclave in the presence of air, but this (the presence of air) necessitates a relatively large increase in the temperature and pressure, and a cumbersome apparatus. According to a preferred embodiment of the invention, this phase of the fabrication is carried out in a liquid-filled autoclave, wherein the compression liquid is the surface active agent bath itself.

In one variant, the preliminary combination comprised of the film and the support is steeped in a bath of surface active agent(s) brought to about 120° C., for a period of about 1 hr. If the film is already in its final optical state, brought about, e.g., by preliminary combination by means of calendering, it is not necessary thereafter (i.e., after the surfactant treatment) to subject the aggregate to an autoclave cycle.

According to another feature of the invention, the film is treated, particularly by steeping in the surface active agent bath, at a stage when said film is combined in permanent fashion with the support whereof said film comprises the external layer. This variant of the method may be carried out at ambient temperature and atmospheric pressure, whereby it is of relatively long duration; however, this treatment duration may be reduced considerably if the temperature is increased and the operation is carried out in an autoclave under pressure.

Other characteristics and advantages of the invention will be apparent from the following description of exemplary embodiments of the method of the invention, with descriptions of comparative tests of properties of treated panes.

Pane samples wherein the external layers were treated according to the invention were subjected to three types of tests indicating the effectiveness of the treatment:

A fogging test, wherein the sample is held for 15 sec above a water bath maintained at 40° C., after having been held for 48 hr following the inventive treatment at a holding temperature of 23° C. and at relative humidity 50%. The transparency of the sample and the form of the droplets are then observed.

An abrasion resistance test, according to Eur. Std. R 43. For this test, part of the sample is subjected to abrasion by an abrasive grinding wheel. After abrasion amounting to 100 revolutions of the wheel, the difference in blur between the abraded and non-abraded parts is measured with a spectrophotometer. The difference in blur should be less than 4% for the film to be characterized as antiabrasive.

A scratch resistance test, known as the "MAR resistant test". It is carried out with an Erichsen Type 413 apparatus. In it one measures the load (i.e., force or pressure) which must be applied to a diamond-surfaced scoring head to produce a persistent scratch on the treated plastic film. The force must be equal to or greater than a 20 gram force for the plastic film to be characterized as self-healing.

A number of treated and untreated samples were subjected to these different tests.

The basic sample employed was a glass pane 300×300 mm, comprised of: a glass sheet 2.7 m thick produced by the float process on a bath of tin (hereinafter called "float glass"); an intermediate sheet of polyvinylbutyral (PVB) 0.76 mm thick; and a second sheet of float glass 1.5 mm thick. In Examples 1 to 7, the following conditions were varied: temperature, pressure, and composition of the surfactant bath; and the treatment was carried out after premanent combination of a sheet or film of heat-setting polyurethane and the glass. In Example 8, the treatment was carried out after partial combination.

The film of heat-setting polyurethane treated was produced according to the process described, e.g., in Fr. Pat. No. 2,398,606, said film being namely a film 0.4 mm thick formed, e.g., from the following mixture:

1000 g of a polyether prepared by condensing 1,2-epoxypropane with a triol, said polyether having a molecular weight of about 450 and a content of free OH groups of 10.5 to 12 wt. %;
23 g of di-t-butyl-p-cresol;
0.5 g of dibutyltin dilaurate; and
1000 g of a biuret of 1,6-hexanediisocyanate, having a content of free NCO groups of 21 to 25 wt. %.

This reaction mixture was applied to a flat molding support by means of a flow-molding head such as that described in Fr. Pat. No. 2,347,170. Polymerization of the layer of mixture was carried out by application of heat, and the layer was then covered with an adhesive layer comprised of a thermoplastic polyurethane, said covering accomplished by flow-molding a formulation on top of the polyurethane film which has been polymerized as described. The result was a two-layer film 0.5 mm thick. Such a film is described, e.g., in Fr. Pat. No. 2,398,606 cited supra. The said film was detached from the molding support to be combined with the sample support, namely a sheet of glass.

The tests were also carried out on two comparison samples.

Comparison sample 1 was a sample of the basic type covered with the film but not treated with the surfactant.

Comparison sample 2 was a sheet of glass treated by steeping in a bath comprised of a $C_{12}$ to $C_{14}$ linear alcohol ethoxylated by about 7 moles epoxyethane per mole of the alcohol. Such an ethoxylated alcohol is, e.g., the commercial product supplied by the firm Henkel/Dehydag under the name "Dehydol LS 7". The sheet of glass was steeped 2 hr in such a bath maintained at 80° C.

The results of the tests are shown in Table 1.

The results obtained with comparison sample 2 are comparable to those obtained with a bare sheet of glass which has not been treated. It may be concluded that the treatment is totally ineffective when applied to a bare glass sheet, which demonstrates that the treatment is specifically effective for a transparent plastic material such as the heat-setting polyurethane.

EXAMPLE 1

The sample was steeped 2 hr at 80° C. in a bath comprised entirely of the product "Dehydol LS 7" supplied by the firm Henkel/Dehydag.

EXAMPLE 2

The sample was steeped at 2 hr at 80° C. in a bath comprised of the product of Example 1 in a 67% aqueous solution.

EXAMPLE 3

The sample was steeped 2 hr at 80° C. in a bath comprised entirely of an octyl alcohol ethoxylated by about 4 moles of epoxyethane per mole of the alcohol. Such an ethoxylated alcohol is, e.g., the commercial product "Dehydol 04" supplied by the firm Henkel/Dehydag.

EXAMPLE 4

The sample was steeped 100 hr at 20° C. in a bath comprised entirely of the product of Example 3.

EXAMPLE 5

The sample was steeped one-half hour at 100° C. in a bath comprised entirely of the product of Example 4, in an autoclave where a pressure of 12 bar prevailed.

EXAMPLE 6

The sample was steeped 2 hr at 80° C. in a bath comprised of a 35 wt. % aqueous solution of a cationic surface active agent, which agent was namely lauryl dimethyl benzylammonium chloride. Such an agent is, e.g., the commercial product "Dehyquart LDB" supplied by the firm Henkel/Dehydag.

EXAMPLE 7

The sample was steeped 2 hr at 80° C. in a bath comprised of a 30 wt. % aqueous solution of an anionic surface active agent, which agent was namely linear $C_{12}$ to $C_{16}$ sodium sulfate. Such an agent is, e.g., the commercial product "SULFOPAN 101" supplied by the firm Henkel/Dehydag.

EXAMPLE 8

The steeping treatment was carried out with the film not permanently (i.e., by "not permanently" is meant "preliminarily") combined with the support. A preliminary combination of the film and the glass sheet was produced by calendering. Then the glass pane was introduced into a bath of surface active agent(s), e.g. the bath described in Example 5, and the ensemble (i.e., "sample plus bath") was placed in an autoclave and held at 100° C. and 12 bar of one-half hour.

The results of the tests demonstrate the effectiveness of the method, both for accomplishing adhesion of the film of polyurethane to the laminated glass pane and for achieving diffusion of the molecules of the surface active agent(s) into the interior structure of the film.

The results collected in Table 1 demonstrate in particular the effectiveness of the inventive treatment for the dual objective of abrasion resistance and antifogging action. Comparing the blur difference produced in the abrasion test between a sample glass pane covered with an antifogging film according to the invention and a sample covered with the usual film, one finds a difference which may attain an index of 2%.

It may be necessary, in order to further improve the abrasion resistance (to the necessary degree) of a safety glass pane covered with a layer of transparent, highly elastic, three-dimensionally crosslinked plastic of the ordinary type according to the prior art, to treat the external film with a wax-based formulation. This supplementary treatment may be dispensed with if surface active agent(s) are caused to diffuse into the surface of the film. The blur difference measured in the abrasion resistance test is less by a factor of 2 for a laminated glass pane subjected to an antifogging treatment according to the invention and no treatment with a wax-based composition, than for a laminated glass pane subjected to a treatment with a wax-based composition and not to an antifogging treatment according to the invention.

To confirm the antifogging effects for automobile safety windshields having the same structure as the samples described in the above Examples, accelerated fogging tests were conducted on a vehicle whereon only a part of the windshield had been treated according to the invention.

For these tests, an electric boiler was installed in the interior of the vehicle to supply the humidity required for the simulation. After 3 min of operation of the boiler, and with an exterior temperature of about 5° C., the windshield was covered with fog; and this fogging occurred to a much greater extent on the untreated part, which part was in fact made practically opaque, while the treated part continued to provide satisfactory visiblity. The defroster fan was then operated for about 2 min, after which the treated part had recovered its original transparency while the untreated part of the windshield retained a cloudy appearance which was obstructive and annoying to the driver.

TABLE 1

| Example | Following test | Abrasion test: increase in blur or cloudiness, % | Scratch resistance, g |
|---|---|---|---|
| Cfsn. Ex, 1 | Dense, milky fogging comprised of numerous small droplets, with transparency | 3.7 | 21 |
| Comparison Example 2 | Dense, milky fogging comprised of numerous small droplets, which loss of transparence. | — | — |
| Example 1 | Continuous water film with satisfactory transparency. | 1.5 | 22 |
| Example 2 | Continuous water film with satisfactory transparence. | 2.7 | 21 |
| Example 3 | Flat water droplets which merge to form a film of acceptable transparence. | 1.4 | 20 |
| Example 4 | Flat water droplets which merge to form a film of acceptable transparence. | 1.2 | 15 |
| Example 5 | Continuous water film with satisfactory transparence. | 1.7 | 19 |
| Example 6 | Fairly flat water droplets with acceptable transparence. | 3.6 | 23 |
| Example 7 | Fogging, almost milky, with reduced transparence. | 3.7 | 33 |
| Example 8 | Continuous water film with satisfactory transparence. | 1.8 | 21 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A coating or film having anti-lacerative or self-healing properties comprising a transparent, highly elastic, heat-setting three dimensionally crosslinked polyurethane, and an effective amount of at least one surface active agent comprising one or more $C_8$–$C_{16}$ polyethoxylated fatty alcohols disposed therein.

2. The coating or film of claim 1 wherein the surface active agent is a $C_{12}$ to $C_{14}$ linear alcohol ethoxylated by about 7 mols of epoxyethane per mole of the alcohol.

3. The coating or film of claim 1 wherein the surface active agent is an octyl alcohol ethoxylated by about 4 moles of epoxyethane per mole of the alcohol.

4. The coating or film of claim 1, wherein said surface active agent is used in an amount by weight which is approximately equal to the amount of polyurethane used.

5. A laminated pane comprising:
   (a) a monolithic or laminated support of a silicate glass material or plastic material, and
   (b) a coating or film layer on said support having anti-lacerative or self-healing properties comprising a transparent, highly elastic, heat-setting three-dimensionally crosslinked polyurethane and an effective amount of at least one surface active agent comprising one or more $C_8$–$C_{16}$ polyethoxylated fatty alcohols disposed therein.

6. The laminated pane of claim 5, wherein the surface active agent is a $C_{12}$–$C_{14}$ linear alcohol ethoxylated by about 7 moles of epoxyethane per mole of the alcohol.

7. The laminated pane of claim 5, wherein the surface active agent is an octyl alcohol ethoxylated by about 4 moles of epoxyethane per mole of the alcohol.

8. The laminated pane of claim 5, wherein said surface active agent is used in an amount by weight which is approximately equal to the amount of polyurethane used.

* * * * *